United States Patent Office 3,586,666
Patented June 22, 1971

3,586,666
2-(2-NAPHTHYL)AZIRIDINE
Keizo Kitahonoki, Ikoma-gun, and Katsumi Kotera, Mishima-gun, Japan, assignors to Shionogi & Co., Ltd., Osaka, Japan
No Drawing. Continuation-in-part of abandoned application Ser. No. 510,046, Nov. 26, 1965. This application Sept. 3, 1969, Ser. No. 855,020
Claims priority, application Japan, Nov. 26, 1964, 39/66,755; Aug. 13, 1965, 40/49,466
Int. Cl. C07d 23/02
U.S. Cl. 260—239
1 Claim

ABSTRACT OF THE DISCLOSURE

A compound of the formula:

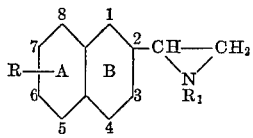

wherein R represents hydrogen, halogen, lower alkyl or lower alkoxy, $R_1$ represents hydrogen or acyl, R is possibly present on Ring A and Rings A and B may be aromatic or alicyclic, being useful as a tranquilizer or antidepressant, is prepared by reducing the corresponding oxime compound with a metallic hydride complex in an inert solvent.

---

This application is a continuation-in-part of U.S. application Ser. No. 510,046, filed Nov. 26, 1965 and now abandoned.

The present invention relates to aziridine compounds. Particularly, it relates to a compound represented by the formula:

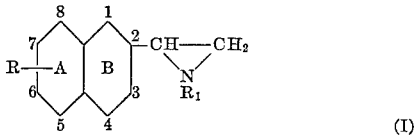

where R represents hydrogen, halogen, lower alkyl or lower alkoxy, $R_1$ represents hydrogen or acyl, R is possibly present on Ring A and Rings A and B may be each aromatic or alicyclic, which is useful as a tranquilizer or antidepressant. The invention also relates to the production of the said compound.

Accordingly, a basic object of the present invention is to embody novel aziridine compounds (I). Another object of the invention is to embody aziridine compounds (I) useful as a tranquilizer, or antidepressant. A further object of this invention is to embody a process for the production of the aziridine compounds (I). These and other objects will be apparent to those conversant with the appurtenant art from the following description of the general class of compounds and the several specific examples and methods of obtaining them presented.

According to the present invention, the said aziridine compound (I) can be prepared by reducing an oxime compound represented by the formula:

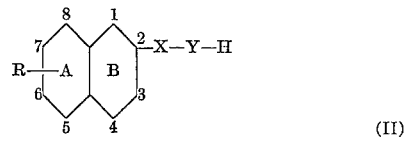

wherein R represents hydrogen, halogen, lower alkyl or lower alkoxy and is possibly present on Ring A and an alternative of X and Y is a substituted or unsubstituted oxime group and another of X and Y is methylene and Rings A and B may be aromatic or alicyclic with a metallic hydride complex in an inert solvent. In the above Formula II, R involves hydrogen, halogen (e.g. chlorine, bromine, iodine), lower alkyl (e.g. methyl, isopropyl, n-butyl) or lower alkoxy (e.g. isopropoxy, methoxy n-pentoxy, ethoxy) which is possibly present in any of 5-position to 8-position on Ring A. Examples of the substituent on the oxime group are lower alkyl (e.g. ethyl, n-butyl, methyl), lower alkanoyl (e.g. acetyl, isopropionyl), aryloyl (e.g. benzoyl, substituted benzoyl), lower alkoxycarbonyl (e.g. ethoxycarbonyl, methoxycarbonyl) and sulfonyl (e.g. toluenesulfonyl, benzenesulfonyl, ethanesulfonyl). These substituents can be connected to the oxime group by ethereal bonding or ester bonding. The said starting material involves illustratively;

1-(2-naphthyl)-1-hydroxyiminoethane,
6-acetyltetralin oxime,
2-acetyl-6-methoxytetralin oxime,
1-(6-chloro-2-naphthyl)-1-hydroxyiminoethane, and
2-(2-naphthyl)-1-hydroxyiminoethane.

The starting oxime compound (II) can be prepared in a per se conventional manner such as by reacting a carbonyl compound with hydroxylamine hydrochloride in the presence of pyridine.

As the metallic hydride complex, there are exemplified lithium aluminum hydride, magnesium aluminum hydride and sodium aluminum hydride. The reduction can be carried out in the range of temperature from 15° C. to the boiling point of the solvent used in an inert solvent such as ether, tetrahydrofuran, diglyme or tetrahydropyran, when needed, in the presence of a basic adjuvant such as tert-pentylamine, n-propylamine, sec-octylamine, diethylamine, N-ethyl - n - propylamine, N-methyl-n-butylamine, pyrrolidine, piperazine, N-methyl benzylamine or N-ethyl-β-phenylethylamine. The resultant crude aziridine compound can be purified in a per se conventional separating procedure such as by recrystallization, columnar chromatography, thin layer chromatography or gas phase chromatography. The thus obtained aziridine compound (I) ($R_1$=hydrogen) can be, when required, converted into a suitable derivative such as acylate for the purpose of separation, isolation, purification or manufacture of a medicinal. Examples of the acylating reagent are: isocyanate (e.g. phenylisocyanate, p-nitrophenylisocyanate), isothiocyanate (e.g. p-nitrophenylisothiocyanate), dialkyl pyrocarbonate (e.g. diethyl pyrocarbonate, dimethyl pyrocarbonate), aryloyl halide (e.g. p-nitrobenzoyl chloride, benzoyl chloride) and alkyl phenoxycarbonate (e.g. ethyl p-nitrophenoxycarbonate, methyl 2,4-dinitrophenoxycarbonate). The acylation can be carried out in a per se conventional manner, for instance, under cooling, at room temperature or under heating in an inert solvent such as water, alcohols, ethers, benzene, toluene, dioxane, diglyme, tetrahydrofuran or tetrahydropyran. In practice, the reagent and solvent must be selected suitably according to the object of the acylation. Illustrative examples of acylates in the N-position of the aziridine ring are phenylcarbamoyl compound, p-nitrophenylcarbamoyl compound, phenylthiocarbamoyl compound, p-nitrobenzoyl compound, ethoxycarbonyl compound and methoxycarbonyl compound.

The thus-produced aziridine compounds (I) involve illustratively;

2-(2-naphthyl)aziridine,
1-ethoxycarbonyl-2-(2-naphthyl)aziridine,
6-(2-aziridinyl)tetralin,
6-[1-(p-nitrobenzoyl)aziridin-2-yl]tetralin,
2-(6-chloro-2-naphthyl)aziridine,
2-(2-aziridinyl)-6-methoxytetralin, and
1-phenylcarbamoyl-2-(2-naphthyl)aziridine.

These aziridine compounds (I) are useful as a tranquilizer or antidepressant, and they are also useful as intermediary compounds in the preparation of medicinals. For instance, 2-(2-naphthyl)aziridine shows unique tranquilizing activity. The pharmacological data showing the significance of the said compound as a narcosis potentiating agent, grip-strength action-inhibitor, hypothermic agent, condition avoidance agent, antiemetic agent and cataleptic agent were observed, and data comparing the effects of the said compound with chlordiazepoxide, prochlorperazine and chlorpromazine are shown in Table 1.

TABLE 1

| Test compound | Chlorpromazine | Prochlorperazine | 2-(2-naphthyl)aziridine | Chlordiazepoxide |
| --- | --- | --- | --- | --- |
| Potentiating narcosis [1] | 1.1 | 7.1 | 14.4 | 17.4 |
| Hypothermic activity [2] | 1.5 | 10.4 | 19.2 | 50 |
| Traction test [3] | 2.5 | 23.5 | 19.7 | 20 |
| Conditioned reflex [4] | 1–2 | 1–2 | 2–4 | 5–10 |
| Antiemetic activity [5] | 1.63 | 0.44 | 1.85 | |
| Cataleptic activity [6] | | 23.4 | 67 | |

[1] Potentiating narcosis is observed by administering a test compound subcutaneously to mice and after 10 minutes administering 35 mg./kg. of sodium thiopental intravenously to the mice and examining the extent of narcosis over 10 minutes. It is shown by $ED_{50}$ mg./kg. [Gairndt: Arch. t. exp. u. Pharmacol., vol. 164, 118 (1932)].

[2] Hypothermic activity is observed by administering a test compound subcutaneously to mice and after 90 minutes examining the fall of body temperature over 3° C. and it is shown by $ED_{50}$ mg./kg. [Lessin et al. Brit. J. Pharmacol., 12, 245–250 (1957)].

[3] Traction test is observed by administering a test compound to mice and after 90 minutes examining the inhibition of grip strength action in less than 10 seconds, and it is shown by $ED_{50}$ mg./kg. [Courvoisier et al.: Psychotropic Drugs, 373 (1957)].

[4] Condition reflex is observed by administering a test compound subcutaneously to rats and examining Siedman's avoidance, and it is represented by an effective dose (mg./kg.) [Siedman: Science, 118, 157–158 (1953)].

[5] Antiemetic activity is observed by administering a test compound subcutaneously to dogs, and after 90 minutes administering 0.03 mg./kg. of apomorphine subcutaneously to the dogs and examining for vomiting action and it is shown by $ED_{50}$ mg./kg. [Freedman: Science, 124, 264–265 (1956)].

[6] Cataleptic activity is observed by administering a test compound subcutaneously to rats and after 120 minutes examining the extent of catalepsy over 30 seconds while preserving rat legs on four corks, and it is shown by $ED_{50}$ mg./kg. [Winth et al.: Arch. int. Pharmacody, 115, 1–31 (1958)].

Note: Acute toxicity ($LD_{50}$) is determined as follows: A test compound is applied subcutaneously to mice in different single doses. For each dose 10 mice are used, their weight ranging from 15 to 17 grams. The mice are observed for 24 hours after the administration of the compound. The $LD_{50}$ represents the amount of the compound which is expected to kill half the number of mice treated. This is calculated by graphic interpolation from two doses actually used, one of which kills less than half and the other more than half the number of mice treated (Schleicher and Schull probability graphic paper 298 ½ is used for the graphic interpolation).

Further, acute toxicity of 2-(2-naphthyl)aziridine is as follows: $LD_{50}$ 180 mg./kg., by subcutaneous administration to rats.

Presently-preferred and practical embodiments of the present invention are illustratively shown by the following examples. The temperatures are set forth in degree centigrade.

EXAMPLE 1

To a suspension of lithium aluminum hydride (1.741 g.) in tetrahydrofuran (20 ml.), there is added dropwise a solution of 1-(2-naphthyl)-1-hydroxyiminoethane (2.092 g.) in tetrahydrofuran (50 ml.) with cooling, and the resultant mixture is refluxed for 4 hours, chilled below 5° C., mixed with a small amount of water to decompose the excess of lithium aluminum hydride and filtered. The insoluble part is washed with ether. The filtrate is combined with the ethereal washings, the mixture is dried over potassium carbonate, and the solvent is evaporated. The residue is purified by passing through an alumina column to give 2-(2-naphthyl)aziridine (309 mg.) as crystals melting at 102.5 to 103.5° C.

To a solution of 2-(2-naphthyl)aziridine (1.006 g.) in ether (20 ml.), there is added a solution of diethyl pyrocarbonate (1.162 g.) in ether (5 ml.). The resultant mixture is allowed to stand at room temperature for 4 hours. After evaporation of the ether, the residue is distilled to give 1-ethoxycarbonyl-2-(2-naphthyl)aziridine (1.118 g.) as an oil boiling at 130 to 132° C./0.15 mm./Hg.

EXAMPLE 2

To a suspension of lithium aluminum hydride (4.4 g.) in tetrahydrofuran (100 ml.), there is added dropwise a solution of diethylamine (8.5 g.) in tetrahydrofuran (10 ml.) and the resultant mixture is stirred for an hour. A solution of 6-acetyl tetralin oxime (5.0 g.) in tetrahydrofuran (50 ml.) is added dropwise to the mixture, which is refluxed for 5 hours. The reaction mixture is mixed with a small amount of water to decompose the excess of lithium aluminum hydride and filtered. The insoluble part is washed with ether. The filtrate is combined with the ethereal washings, dried over potassium carbonate and the solvent is evaporated to give an oily residue (4.5 g.). The residue is purified by passing through an alumina column to give 6-(2-aziridinyl)tetralin (2.914 g.) as a colorless oil boiling at 135 to 136° C./5 mm. Hg.

The product is treated with p-nitrobenzoyl chloride to give 6-[1-(p-nitrobenzoyl)aziridin-2-yl]tetralin as crystals melting at 111 to 112° C.

EXAMPLE 3

A solution of 1-(6-chloro-2-naphthyl)-1-hydroxyiminoethane (2.09 g.), N-methyl-n-butylamine (3.2 g.) and lithium aluminum hydride (1.4 g.) in tetrahydrofuran (112 ml.) is refluxed for an hour, and the reaction mixture is mixed with a small amount of water and filtered. The filtrate is evaporated under reduced pressure and the residue is purified by passing through an alumina column to give 2-(6-chloro-2-naphthyl) aziridine as crystals melting at 147 to 148° C. The yield is 51%.

EXAMPLE 4

A solution of 2-(2-naphthyl)-1-hydroxyiminoethane (93 mg.), N-methyl-n-butylamine (130 mg.) and lithium aluminum hydride (57 mg.) in tetrahydrofuran (5 ml.) is heated at 60° C. for 4 hours in a closed tube, and the reaction mixture is mixed with a small amount of water to decompose the excess of lithium aluminum hydride. The mixture is filtered, and the filtrate is chromatographed in gas phase. There is obtained 2-(2-naphthyl)aziridine as crystals melting at 102.5 to 103.5° C. The yield is 73%.

The product is treated with phenylisocyanate in ether to give 1-phenylcarbamoyl-2-(2-naphthyl)aziridine as crystals melting at 145 to 146° C.

What is claimed is:
1. The compound 2-(2-naphthyl)aziridine.

References Cited

Gembitskii et al.: Russian Chemical Reviews, vol. 35, p. 116 (1966).

Shionogi & Co., Ltd. Chemical Abstracts, vol. 65, col. 15324–15325 (1966).

ALTON D. ROLLINS, Primary Examiner

U.S. Cl. X.R.

260—471, 566; 424—244